United States Patent [19]

Yakubek

[11] 3,757,924

[45] Sept. 11, 1973

[54] CHAIN DRIVEN MACHINERY

[75] Inventor: Louis P. Yakubek, Perrysburg, Ohio

[73] Assignee: Owens-Illinois, Inc., Toledo, Ohio

[22] Filed: Sept. 30, 1971

[21] Appl. No.: 185,285

Related U.S. Application Data

[63] Continuation-in-part of Ser. No. 6,895, Jan. 29, 1970, abandoned.

[52] U.S. Cl................... 198/19, 198/203, 198/181
[51] Int. Cl............................................. B23q 5/22
[58] Field of Search................... 198/203, 19, 163, 198/34

[56] References Cited
UNITED STATES PATENTS
2,918,020  12/1959  Henderson.......................... 198/203

*Primary Examiner*—Richard E. Aegerter
*Attorney*—J. R. Nelson et al.

[57] ABSTRACT

In chain driven machinery, a pair of endless chains, each of which has work elements thereon. Portions of the chains are moved in parallel relation to one another. Means are provided for maintaining a predetermined pitch length between the elements of the chains along the parallel portion.

2 Claims, 7 Drawing Figures

Patented Sept. 11, 1973
3,757,924
3 Sheets-Sheet 1
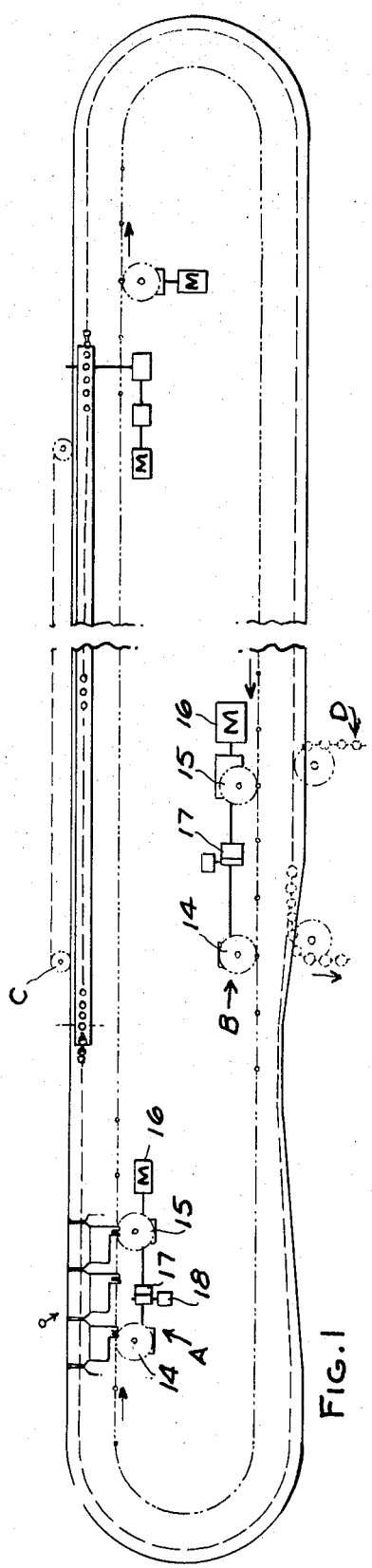
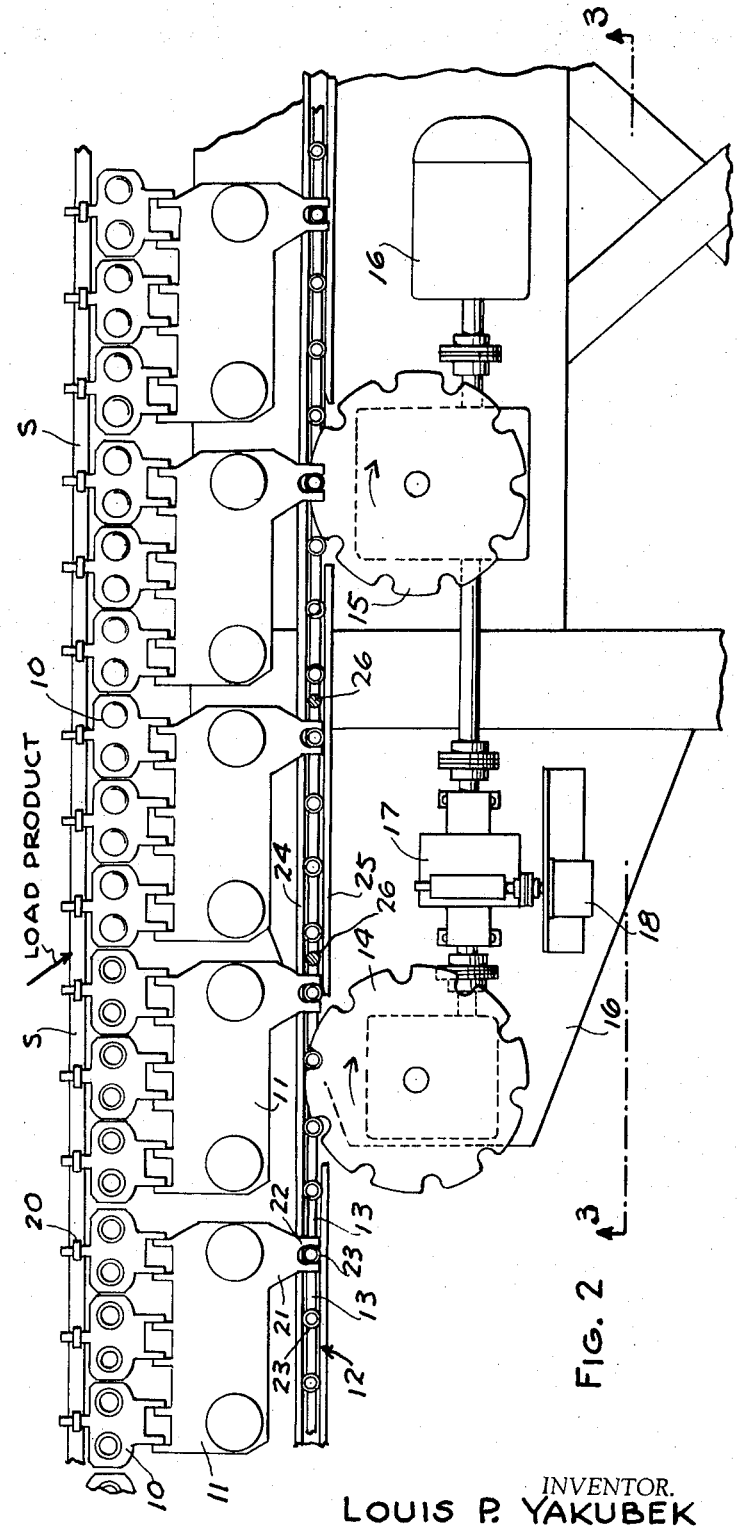
INVENTOR.
LOUIS P. YAKUBEK
BY John R. Nelson and
E. J. Haller
ATTORNEYS Patented Sept. 11, 1973

INVENTOR.
LOUIS P. YAKUBEK
BY John R. Nelson and
E. J. Haller
ATTORNEYS

Patented Sept. 11, 1973

INVENTOR
LOUIS P. YAKUBEK

BY J. R. Nelson and
E. J. Haller
ATTORNEYS

CHAIN DRIVEN MACHINERY

This application is a continuation-in-part of my earlier filed, copending application (abandoned since filing this application), Ser. No. 6,895, filed Jan. 29, 1970.

This invention relates to machinery wherein parts are moved along in relative registry.

BACKGROUND OF THE INVENTION

In making of glassware and the like, it is often necessary to move one work element, such as workpiece, in parallel synchronism with another work element, such as a plunger or transfer device. Conveyors for moving the workpiece conventionally comprise articulated chain conveyors which support the work elements. With such chain conveyors, each of which is made of pivotally interconnected elements, wear and lost motion may occur which results in lack of registry between the work elements on one conveyor and those of the other conveyor.

Accordingly, among the objects of the invention are to provide a method and apparatus for registering the work elements regardless of lost motion or wear; which apparatus is relatively simple and low in cost; and which will permit substantial wear of chains before replacement is required.

SUMMARY OF THE INVENTION

In accordance with the invention a pair of endless chains is provided, each of which has work elements thereon. Portions of the chains are moved in parallel relation to one another. Means are provided for maintaining a predetermined pitch length between the elements of the chains along the parallel portion.

DESCRIPTION OF THE DRAWINGS

FIG. 1 is a diagrammatic plan view of an apparatus embodying the invention.

FIG. 2 is a fragmentary plan view on an enlarged scale of a portion of the apparatus shown in FIG. 1.

DESCRIPTION

Figure 3:
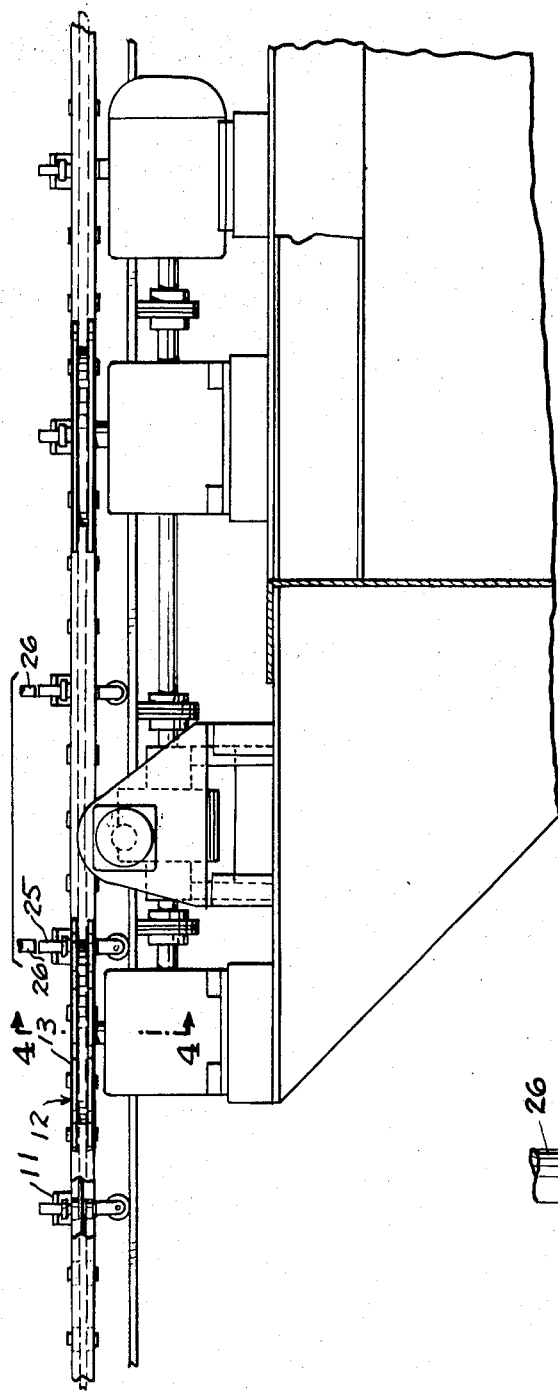
FIG. 3 is a fragmentary sectional view taken along the line 3—3 in FIG. 2.

Referring to FIG. 2, the invention is shown in connection with a glass forming apparatus wherein a plurality of glass articles are supported on work holders 10 that are pivoted at one end about horizontal axes on work supports 11 and rest at the other end on a fixed support 8. Each work support 11 is adapted to be moved along by an endless chain conveyor 12 driven by a sprocket S rotated by a motor M. Each chain conveyor 12 includes elements 13 pivotally interconnected with one another.

In order to insure proper spacing or pitch between the work supports 11, an apparatus is provided which includes longitudinally spaced sprockets 14, 15 that are mounted for rotation about vertical axes on a support 16a. The sprockets 14, 15 are connected to gear boxes 14a and 15a and are driven by a motor 16 through line drive shaft 16b. The drives of sprockets 14, 15 are interconnected to one another through a line shaft phase shifting differential 17. A reversible control motor 18 is adapted to momentarily drive the differential 17 to change the relative rotational positions of the sprockets 14, 15. In this fashion the portion of the conveyor which is between the sprockets is maintained at a predetermined length so that the pitch between the interconnected elements 13 of the portion of the length of the chain between the sprockets is constant.

Figure 7:
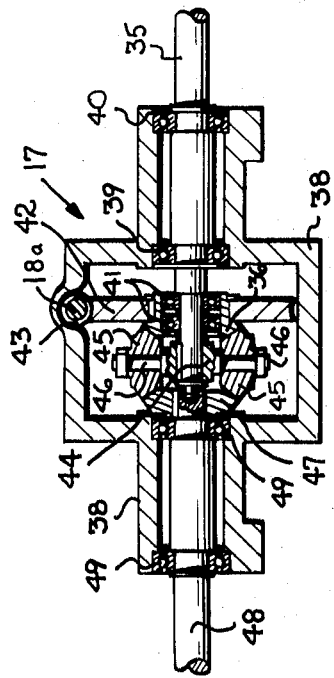
FIG. 7 is a longitudinal sectional elevational view of the line shaft phase shifting differential mechanism taken along the line 7—7 in FIG. 2.

The line shaft 15b is coupled to the input shaft 35 of line shaft shifting differential 17. This differential may be of the type sold under the trademark "Specon" by Fairchild Hiller, 1501 Fairchild Drive, Smith Reynolds Airport, Winston-Salem, N.C. As shown on FIG. 7, differential 17 comprises input shaft 35 on which a spider 44 and its gears 45 are fixed. The shaft 35 is mounted in the housing 38 on spaced ball bearings indicated respectively 39 and 40. Ball bearing 41 is held by a pinion 42 in mesh with a worm 43 on the motor shaft 18a, the latter being connected to the reversible control motor 18 (FIG. 2). A bevel gear 36 is connected to the pinion 42 and the pinion position may be advanced or retarded thusly advancing or retarding the teeth of the bevel gear 36. On the inner end of shaft 35 spider 44 has its pair of bevel gears 45 freely rotatable on spindles 46. The pair of spider gears 45 are in mesh with bevel gear 36 and bevel gear 47, the latter being keyed on output shaft 48 that is coupled to the transmission line shaft 14b driving the sprocket 14. Shaft 48 is mounted in bearings 49 held in housing 38. So long as pinion 42 is stationary, driving rotation of the line shaft and input shaft 35 is transmitted to spider 44 and its gears 45 running over stationary bevel gear 36 drive bevel gear 47 and the output shaft 48. Rotation of motor 18 in one direction or another rotates the shaft 18a, worm 43 and momentarily advances or retards the rotary position of pinion 42 and bevel gear 36. This in turn will advance or retard the rotary position of the output shaft 48 and in turn will adjust the rotary position of sprocket 14 with respect to sprocket 15 while the input shaft in in operation (rotation).

By driving the motor 18, it is possible to change the angular position of the sprockets 14, 15 with respect to one another and thereby change the overall length of clain in the portion of conveyor between the sprockets 14 and 15.

Figure 4:
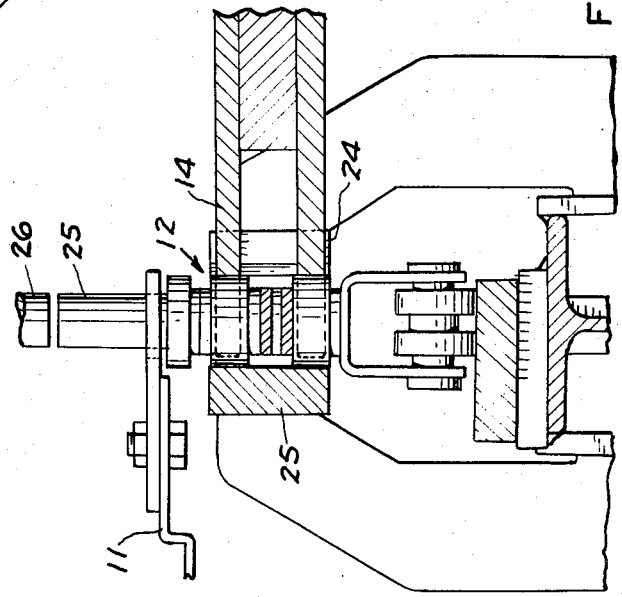
FIG. 4 is a fragmentary sectional view on an enlarged scale taken along the line 4—4 in FIG. 3.

As shown in FIGS. 2, 3 and 4, the work holders 10 have rollers 20 engaging the track S. The work supports 11 have a projection 21 which is bifurcated as at 22 to engage an upstanding roller 23 on the conveyor 12. As shown in FIGS. 1 and 4, in the area between the sprockets 14, 15, the conveyor is confined between side rails 24a, 24b in order that it is maintained so that it can be placed under compression while maintaining the longitudinal alignment of the links or elements 13.

Figure 5:
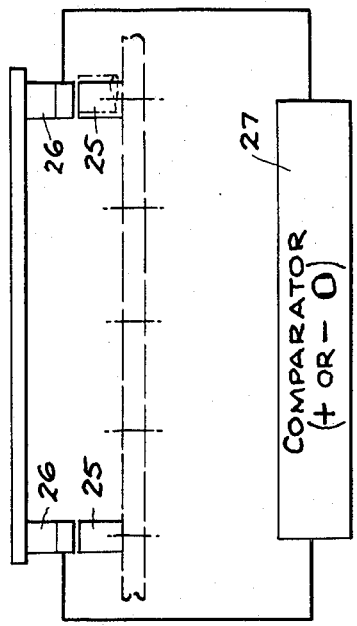
FIG. 5 is a schematic diagram of a comparator utilized in the apparatus shown in FIG. 3.

Sensing elements in the form of projections 25 extend upwardly from the rollers 23. Sensors 26, such as magnetic pickups, are provided in overlying fixed relationship to the path of sensing elements 25 in the area between the sprockets 14, 15. As an element 25 passes one of the sensors 26, a signal is produced. This is shown diagrammatically in FIG. 5. Any misalignment between the pitch of the elements 25, indicating a wear in the conveyor 12, is registered by a comparator 27 to produce a signal. This signal is utilized for actuating the control motor 18 to change the circumferential orientation of sprocket 14 with respect to sprocket 15 thereby compressing or extending the length of chain between the sprockets 14, 15 to insure a proper pitch.

A similar device can be provided on the conveyor which supports work elements that are to be maintained in axial alignment with the workpieces on work support 10.

It can be appreciated that apparatus in accordance with the invention is provided particularly where two conveyors are synchronized, for example, for transfer of articles to and from the conveyors. For example, as shown in FIG. 1, a device A in accordance with the invention is provided at the area where articles are to be acted on by work elements on another conveyor C, and at station B where the articles are removed by another conveyor D.

Figure 6:
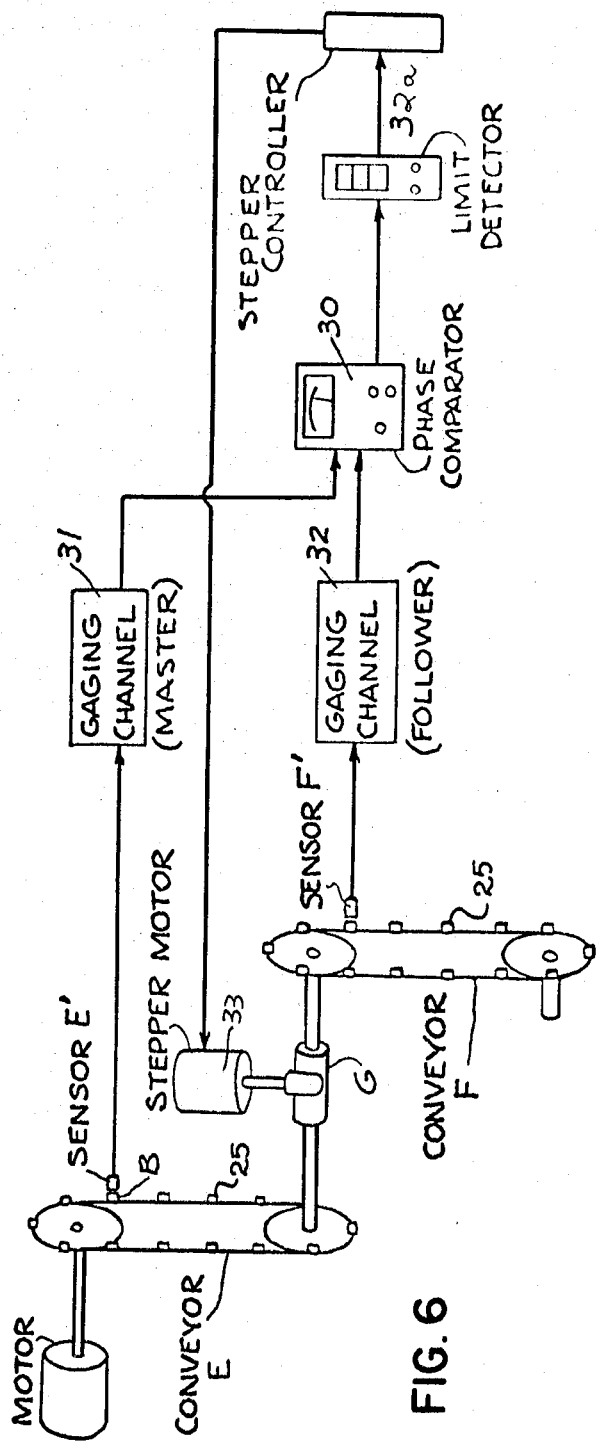
FIG. 6 is a schematic diagram of a further synchronizing apparatus.

Apparatus may also be provided for synchronizing the two conveyors in addition to changing the pitch length between a particular section of the conveyors and is such as shown in FIG. 6 wherein conveyor E has its position sensed by a sensor E' cooperating with sensing members (which may be the sensing elements 25 of FIGS. 3-5) on the conveyor. Similarly, conveyor F has its position sensed by a sensor F'. If there is a lack of synchronism between the conveyors, a comparator 30 operating through gauging channels 31, 32 produces a signal. In the event the discrepancy is more than a predetermined amount, a limit detector 32a operates a stepper motor 33 through a "Stepper Controller" to actuate a differential G for changing the relationship between the two conveyors.

I claim:

1. The combination comprising an endless conveyor having a plurality of pivotally interconnected elements, means for supporting said conveyor for movement in an endless path, at least some of said elements of said conveyor being adapted to move a work element in a predetermined path, a first rotary element for engagement with said conveyor at one point in advance of a portion of said path and a second rotary element for engaging said conveyor beyond said portion of the path, means for controlling the speed of said first and second rotary elements such that they rotate at the same speed, and means for momentarily changing the rotary orientation of one of said first and second elements with respect to the other, thereby maintaining a predetermined pitch length between the elements of the conveyor along the said portion of said path.

2. The combination comprising an endless conveyor having a plurality of pivotally interconnected elements, means for supporting said conveyor for movement in an endless path, at least some of said elements of said conveyor being adapted to move a work element in a predetermined path, means for changing the longitudinal spacing of one said element with respect to another at longitudinally spaced points, and a mechanical differential connected to said rotary elements for controlling the speed of two longitudinally spaced elements such that they are the same.

* * * * *